(12) United States Patent
Wang et al.

(10) Patent No.: US 11,927,695 B2
(45) Date of Patent: Mar. 12, 2024

(54) PHASED ARRAY EMISSION APPARATUS, LiDAR, AND AUTOMATED DRIVING DEVICE

(71) Applicant: SUTENG INNOVATION TECHNOLOGY CO., LTD., Shenzhen (CN)

(72) Inventors: Jing Wang, Shenzhen (CN); Yalin Ren, Shenzhen (CN); Ben Niu, Shenzhen (CN); Lin Zhu, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 247 days.

(21) Appl. No.: 17/576,874

(22) Filed: Jan. 14, 2022

(65) Prior Publication Data
US 2022/0155421 A1   May 19, 2022

Related U.S. Application Data

(63) Continuation of application No. PCT/CN2019/096767, filed on Jul. 19, 2019.

(51) Int. Cl.
*G01C 3/08* (2006.01)
*G01S 7/481* (2006.01)
(Continued)

(52) U.S. Cl.
CPC .......... *G01S 7/4817* (2013.01); *G01S 7/4816* (2013.01); *G01S 17/10* (2013.01); *G01S 17/931* (2020.01); *G01S 17/89* (2013.01)

(58) Field of Classification Search
CPC ...... G01S 7/4817; G01S 7/4816; G01S 17/10; G01S 17/931; G01S 17/89; G01S 17/88;
(Continued)

(56) References Cited

U.S. PATENT DOCUMENTS

2019/0056634 A1   2/2019  Hosseini et al.
2021/0012184 A1*  1/2021  Rodrigues ............. G01S 7/4818

FOREIGN PATENT DOCUMENTS

CN   108693504 A   10/2018
CN   108693505 A   10/2018
(Continued)

OTHER PUBLICATIONS

International Search Report issued in corresponding international application No. PCT/CN2019/096767, dated Apr. 21, 2020, 4 pages.

*Primary Examiner* — Samantha K Nickerson
(74) *Attorney, Agent, or Firm* — BAYES PLLC

(57) ABSTRACT

This application pertains to the technical field of LiDAR, and discloses a phased array emission apparatus, a LiDAR, and an automated driving device. The phased array emission apparatus includes an edge coupler, an optical combiner, and a phased array unit. An output end of the edge coupler is connected to an input end of the optical combiner, and an output end of the optical combiner is connected to an input end of the phased array unit. The edge coupler is configured to input and couple a first optical signal. The optical combiner is configured to transmit, to the phased array unit, the first optical signal coupled by the edge coupler. The phased array unit is configured to split the first optical signal into several first optical sub-signals and emit the first optical sub-signals. In the foregoing method, coupling efficiency can be improved, thereby meeting a low-loss requirement.

8 Claims, 5 Drawing Sheets

(51) Int. Cl.
*G01S 17/10* (2020.01)
*G01S 17/931* (2020.01)
*G01S 17/89* (2020.01)

(58) Field of Classification Search
CPC ....... G01S 7/4815; G01S 7/497; Y02A 90/10; G02F 1/292
See application file for complete search history.

(56) References Cited

FOREIGN PATENT DOCUMENTS

| | | | |
|---|---|---|---|
| WO | 2013078435 | A1 | 5/2013 |
| WO | 2017223299 | A1 | 12/2017 |
| WO | 2018218003 | A1 | 11/2018 |

\* cited by examiner

PHASED ARRAY EMISSION APPARATUS, LiDAR, AND AUTOMATED DRIVING DEVICE

CROSS-REFERENCE TO RELATED APPLICATION

The present application is a continuation of International Application No. PCT/CN2019/096767, filed on Jul. 19, 2019, which is incorporated herein by reference in its entirety.

TECHNICAL FIELD

This application relates to the technical field of LiDAR, and in particular, to a phased array emission apparatus, a LiDAR, and an automated driving device.

BACKGROUND

LiDAR is a radar system that emits a laser beam to detect feature parameters such as a location and a speed of a target, and is widely applied to technical fields such as atmospheric exploration, urban surveying and mapping, ocean exploration, automated driving, robot technologies, laser television, and laser three-dimensional imaging.

Currently, in a phased array LiDAR, a plurality of emission units emit beams that mutually interfere in space to form far-field beams. The far-field beams are used to detect an object, and then a phase difference of light emitted by the emission units is further adjusted in order to adjust a direction of the far-field beams, thereby implementing 360-degree scanning. However, during implementation of the present application, the inventor of the present application finds that a phased array emission apparatus of the phased array LiDAR usually uses a grating coupling mode, which causes a relatively great coupling loss, thereby difficult to meet a low-loss requirement.

SUMMARY

Embodiments of this application aim to provide a phased array emission apparatus, a LiDAR, and an automated driving device, to improve coupling efficiency and meet a low-loss requirement.

According to an aspect of an embodiment of this application, a phased array emission apparatus is provided and includes an edge coupler, an optical combiner, and a phased array unit. An output end of the edge coupler is connected to an input end of the optical combiner, and an output end of the optical combiner is connected to an input end of the phased array unit. The edge coupler is configured to input and couple a first optical signal. The optical combiner is configured to transmit, to the phased array unit, the first optical signal coupled by the edge coupler. The phased array unit is configured to split the first optical signal into several first optical sub-signals and emit the first optical sub-signals.

In an optional implementation, the apparatus further includes a grating coupler. An output end of the grating coupler is connected to the input end of the optical combiner. The grating coupler is configured to input and couple a second optical signal. The optical combiner is configured to transmit, to the phased array unit, the second optical signal coupled by the grating coupler. The phased array unit is configured to split the second optical signal into several second optical sub-signals and emit the second optical sub-signals.

In an optional implementation, the optical combiner includes a first port, a second port, and a third port. The first port is connected to the output end of the edge coupler, the second port is connected to the output end of the grating coupler, and the third port is connected to the input end of the phased array unit. The optical combiner is configured to receive, through the first port, the first optical signal coupled by the edge coupler, and output, through the third port, a part of the first optical signal to the phased array unit based on a preset light splitting ratio of the first port to the second port; or to receive, through the second port, the second optical signal coupled by the grating coupler, and output, through the third port, a part of the second optical signal to the phased array unit based on a preset light splitting ratio of the first port to the second port.

In an optional implementation, the preset light splitting ratio of the first port to the second port is 99:1.

In an optional implementation, the optical combiner is a directional coupler.

In an optional implementation, the optical combiner is a wavelength multiplexer.

In an optional implementation, the apparatus further includes a light source unit. When the apparatus is in a detection state, the light source unit is connected to the grating coupler, and the light source unit is configured to output the second optical signal to the grating coupler. When the apparatus is in a working state, the light source unit is connected to the edge coupler, and the light source unit is configured to output the first optical signal to the edge coupler.

In an optional implementation, two or more of the edge coupler, the grating coupler, the optical combiner, and the phased array unit are integrated on the same chip.

In an optional implementation, the phased array unit includes an optical splitter, provided at the output end of the optical combiner and configured to split the first optical signal into several first optical sub-signals; several phase shifters, provided at the output end of the optical splitter and configured to change phases of several first optical sub-signals, so that the phases of the several first optical sub-signals meet a preset phase requirement; and several emission antennas, provided at output ends of the several phase shifters and configured to emit the first optical sub-signals.

According to another aspect of an embodiment of this application, a LiDAR is provided and includes the foregoing phased array emission apparatus and a phased array receiving apparatus. The phased array emission apparatus is configured to emit an optical signal, and the phased array receiving apparatus is configured to receive an optical signal reflected by a detected object.

According to still another aspect of an embodiment of this application, an automated driving device is provided and includes the foregoing LiDAR and a vehicle body. The LiDAR is provided on the vehicle body.

In the embodiments of this application, the phased array emission apparatus is provided with the edge coupler, and therefore, when in the working state (engraving of the wafer has been completed by then), the phased array emission apparatus uses the edge coupler to implement a relatively low coupling loss, thereby improving coupling efficiency and meeting low-loss requirement in the working state. The phased array emission apparatus is further provided with the grating coupler, and therefore, when performance needs to be detected, the phased array emission apparatus uses the grating coupler to detect performance, thereby finishing detecting the performance without the need of engraving the wafer.

BRIEF DESCRIPTION OF THE DIAGRAMS

One or more embodiments are described by using examples with reference to diagrams in drawings corresponding to the embodiments. These exemplary descriptions do not constitute a limitation to the embodiments. Elements with the same reference numerals in the drawings indicate similar elements. Unless otherwise stated, the diagrams in the drawings do not constitute a proportional limitation.

DETAILED DESCRIPTION

The following describes embodiments of technical solutions in this application in detail with reference to accompanying drawings. The following embodiments are only used to describe the technical solutions of this application more clearly, and therefore, are only used as examples, and cannot be used to limit the protection scope of this application.

Figure 1:
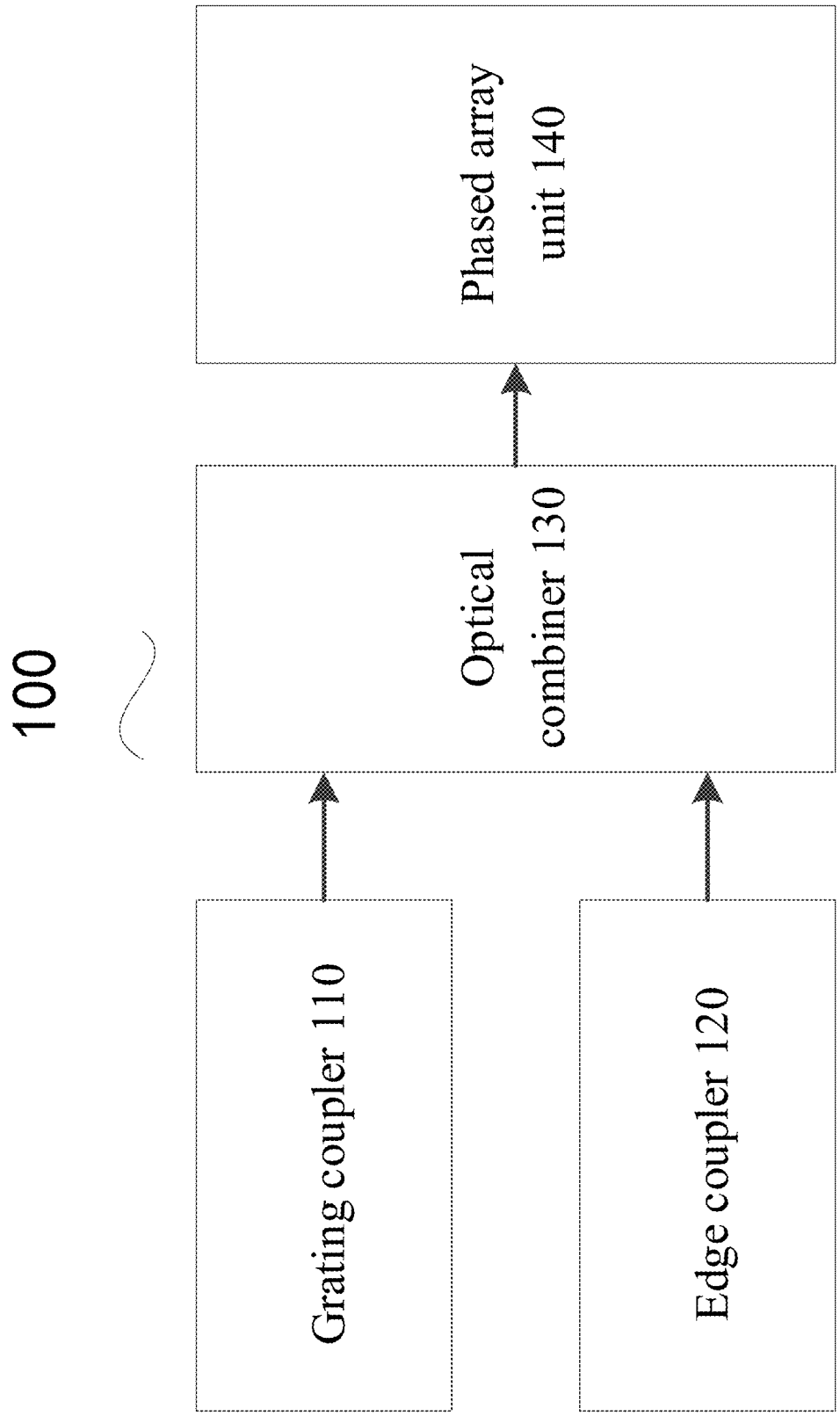
FIG. 1 is a schematic structural diagram of a phased array emission apparatus according to an embodiment of this application.

FIG. 1 is a schematic structural diagram of a phased array emission apparatus according to an embodiment of this application. The phased array emission apparatus 100 includes an edge coupler 120, an optical combiner 130, and a phased array unit 140.

An output end of the edge coupler 120 is connected to an input end of the optical combiner 130, and an output end of the optical combiner 130 is connected to an input end of the phased array unit 140. The edge coupler 120 is configured to input and couple a first optical signal, the optical combiner 130 is configured to transmit, to the phased array unit 140, the first optical signal coupled by the edge coupler 120, and the phased array unit 140 is configured to split the first optical signal into several first optical sub-signals and emit the first optical sub-signals. In the foregoing manner, edge coupling is applied to the phased array emission apparatus 100, to implement a relatively low coupling loss, thereby improving coupling efficiency and meeting a low-loss requirement in a working state.

The phased array emission apparatus 100 further includes a grating coupler 110. An output end of the grating coupler 110 is connected to the input end of the optical combiner 130. The grating coupler 110 is configured to input and couple a second optical signal, the optical combiner 130 is also configured to transmit, to the phased array unit 140, the second optical signal coupled by the grating coupler 110, and the phased array unit 140 is also configured to split the second optical signal into several second optical sub-signals and emit the second optical sub-signals. The phased array emission apparatus 100 uses a grating coupler to perform performance detection without a need of engraving a wafer.

During processing of the phased array emission apparatus 100, the entire wafer is used as a carrier. Generally, the passive waveguide is completely processed first, and then an active structure such as a heater is produced. To improve productivity, after the passive waveguide is completely processed, performance of devices on the entire wafer is detected, and a subsequent process is adjusted in a timely manner based on a detection result. In this embodiment, when performance needs to be detected, the phased array emission apparatus 100 uses the grating coupler 110 to detect performance, thereby finishing detecting the performance without the need of engraving the wafer. When in the working state (engraving of the wafer has been completed by then), the phased array emission apparatus 100 uses the edge coupler 120 to implement a relatively low coupling loss, thereby improving coupling efficiency and meeting the low-loss requirement in the working state.

An input end of the grating coupler 110 is configured to connect an external light source, so that the grating coupler 110 receives a second optical signal output by the external light source. The output end of the grating coupler 110 is connected to the input end of the optical combiner 130, to couple the second optical signal to the optical combiner 130.

The edge coupler 120 is literally referred to as an end-face coupler, and the end-face coupler is a coupler located at an edge of an optical chip and has advantages of high coupling efficiency and large working bandwidth. The edge coupler 120 is formed after the performance detection of the grating coupler 110 is completed. The edge coupler 120 is configured to input the first optical signal and couple the first optical signal to the optical combiner 130.

Optionally, the phased array emission apparatus 100 may further include a light source unit. The light source unit may be a laser array of a fixed wavelength. For example, a ruby laser, a neodymium-doped yttrium aluminum garnet laser, a helium-neon laser, an argon ion laser, a laser integrated on a chip, or the like may be used. Certainly, in some other embodiments, the light source unit may alternatively be a tunable laser and may be selected based on an actual application need. When the phased array emission apparatus 100 is in the working state, the light source unit is connected to the edge coupler 120, and the light source unit is configured to output the first optical signal to the edge coupler 120. When the phased array emission apparatus 100 is in a detection state, the light source unit is connected to the grating coupler 110, and the light source unit is configured to output the second optical signal to the grating coupler 110. The first optical signal may be the same as or different from the second optical signal. However, the first optical signal and the second optical signal are not input simultaneously, the first optical signal is input only when the phased array emission apparatus 100 is working, and the second optical signal is input when the phased array emission apparatus 100 is detecting the performance.

The optical combiner 130 may be a directional coupler or a wavelength multiplexer. For example, when wavelengths of beams in the first optical signal or the second optical signal are different, the optical combiner 130 uses a wavelength multiplexer to integrate the beams of different wavelengths into one optical signal.

The optical combiner 130 is a device with four ports. An input end of the optical combiner 130 is connected to the output end of the grating coupler 110, and another input end of the optical combiner 130 is connected to the output end of the edge coupler 120. An output end of the optical combiner 130 is connected to an input end of the phased array unit 140, and another output end of the optical combiner 130 terminates remotely (for example, a beam terminator can be connected).

Figure 2:
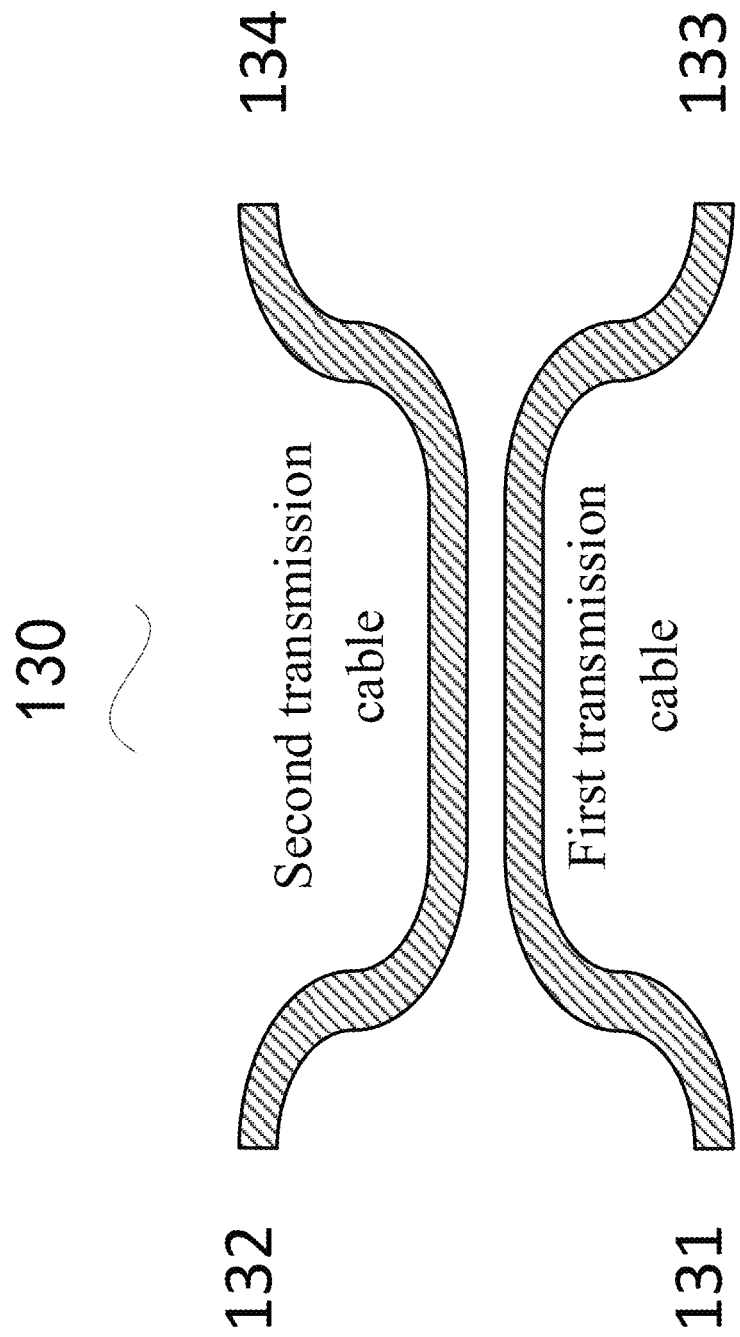
FIG. 2 is a schematic structural diagram of an optical combiner in FIG. 1.

Specifically, referring to FIG. 2, the optical combiner 130 includes a first transmission cable and a second transmission cable. The first transmission cable and the second transmission cable are put so close that power on the first transmission cable can be coupled to the second transmission cable. A first port 131 and a third port 133 are provided at two ends of the first transmission cable, and a second port 132 and a fourth port 134 are provided at two ends of the second transmission cable. The first port 131 and the second port 132 are located on the same side. The third port 133 and the fourth port 134 are located on the same side. The first port 131 is connected to the output end of the edge coupler 120, the second port 132 is connected to the output end of the grating coupler 110, the third port 133 is connected to the input end of the phased array unit, and the fourth port 134 stops remotely.

In this embodiment, the optical combiner 130 is specifically configured to receive, through the first port 131, the first optical signal coupled by the edge coupler 120, and output, through the third port 133, a part of the first optical signal to the phased array unit 140 based on a preset light splitting ratio of the first port 131 to the second port 132; or receive, through the second port 132, the second optical signal coupled by the grating coupler 110, and output, through the third port 133, a part of the second optical signal to the phased array unit 140 based on a preset light splitting ratio of the first port 131 to the second port 132.

A preset light splitting ratio of the first port 131 to the second port 132 refers to a ratio of light output from the first port 131 to that output from the second port 132 when light is input through the third port 133. To receive more light from the edge coupler 120, the optical combiner 130 should be an uneven optical combiner, and a light splitting ratio of a port connected to the edge coupler 120 to a port connected to the grating coupler 110 should be as great as possible. In this embodiment, a preset light splitting ratio of the first port 131 to the second port 132 is 99:1, that is, when 100% of light is input through the third port 133, the first port 131 outputs 99% of the light, and the second port 132 outputs 1% of light. Because a structure of the optical combiner 130 is centrosymmetric, when the first optical signal coupled by the edge coupler 120 is input through the second port 132, 99% of the first optical signal is output from the third port 133, and 1% of the first optical signal is output from the fourth port 134; or when the second optical signal coupled by the grating coupler 110 is input through the first port 131, 1% of the second optical signal is output from the third port 133, and 99% of the second optical signal is output from the fourth port 134.

It should be noted that when detecting performance, the phased array emission apparatus 100 does not require large input optical power, and 1% of the second optical signal output from the third port 133 can also meet the need for detecting the performance; or when the phased array emission apparatus 100 is working, the input optical power needs to be as large as possible, and 99% of the first optical signal output from the third port 133 can meet a requirement in the working state.

Figure 3:
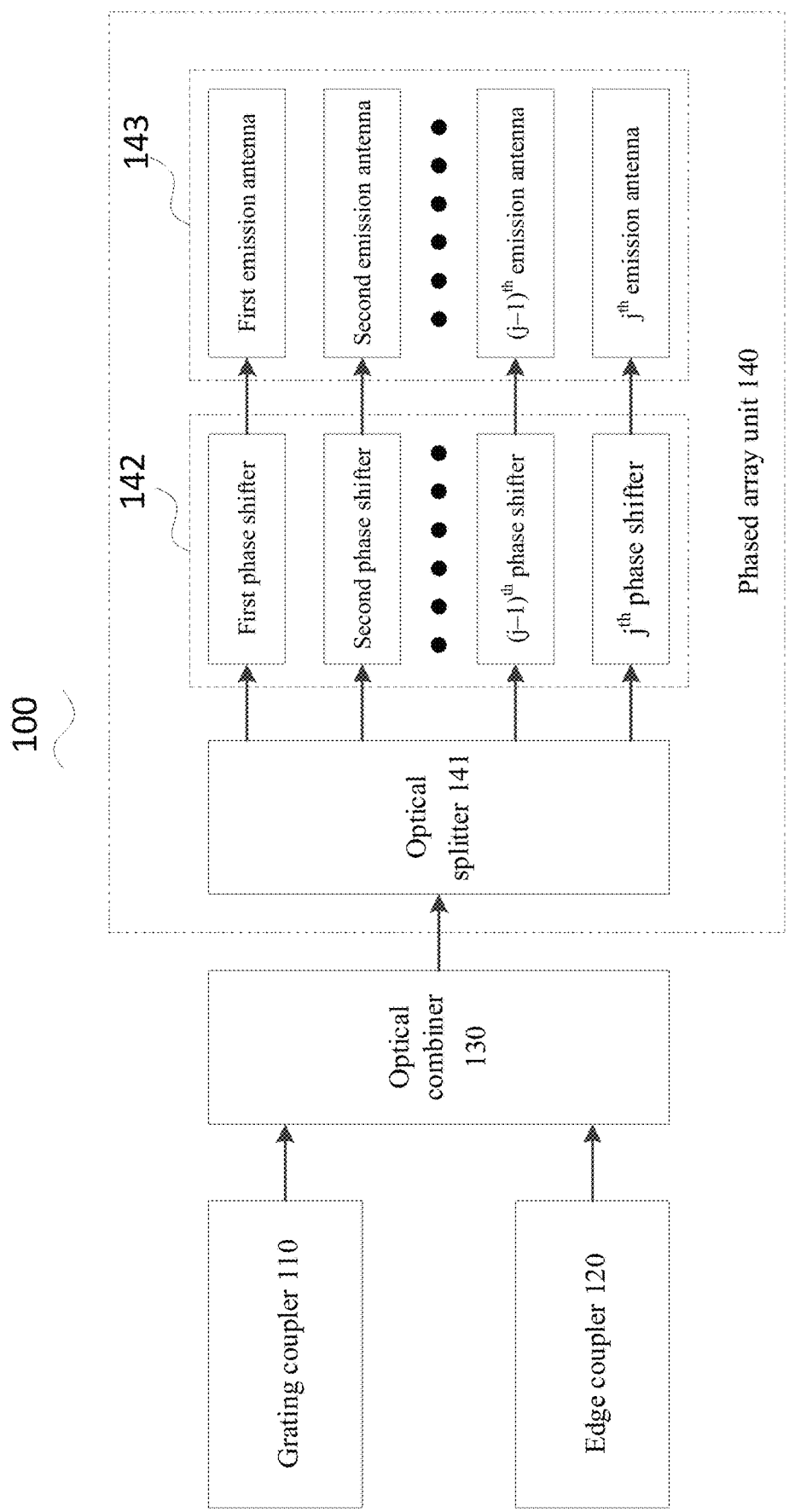
FIG. 3 is a schematic structural diagram of a phased array unit in FIG. 1.

As shown in FIG. 3, the phased array unit 140 includes an optical splitter 141, several phase shifters 142, and several emission antennas 143. The optical splitter 141 is provided at the output end of the optical combiner 130, several phase shifters 142 are provided at output ends of the optical splitter 141, and several emission antennas 143 are provided at output ends of the several phase shifters 142.

The optical splitter 141 is literally an optical path splitter. The input end of the optical splitter 141 is connected to the third port 133 of the optical combiner 130, and the output end of the optical splitter 141 is connected to input ends of several phase shifters 142. The optical splitter 141 is provided with a plurality of output ends, and each output end is connected to an input end of one phase shifter 142. For example, as shown in FIG. 3, the optical splitter 141 is provided with j output ends and j phase shifters 142, and the j output ends are connected to the j phase shifters 142 correspondingly.

In this embodiment, when in a performance detection state, the optical splitter 141 is configured to split, into several second optical sub-signals, the second optical signal output by the optical combiner 130; or when in a working state, the optical splitter 141 is configured to split, into several first optical sub-signals, the first optical signal output by the optical combiner 130. The optical splitter 141 evenly allocates laser signals, so that each output end outputs the same optical signal.

The output ends of the several phase shifters 142 are connected to input ends of the several emission antennas 143. In this embodiment, each phase shifter 142 receives the first optical sub-signal (or the second optical sub-signal) output by the optical splitter 141, and performs phase modulation on the first optical sub-signal (or the second optical sub-signal), to change a phase of the first optical sub-signal (or the second optical sub-signal), so that phases of several first optical sub-signals (or second optical sub-signals) meet a preset phase requirement.

The preset phase requirement refers to a preset phase relationship between the first optical sub-signals (or the second optical sub-signals). For example, it is preset that a phase difference between each two adjacent optical sub-signals is kept consistent. It is assumed that a phase difference between the first optical sub-signals (or the second optical sub-signals) emitted by the phased array emission apparatus 100 is $\varphi$, that is, the phases of the first optical sub-signals (or the second optical sub-signals) are respectively 0, $\varphi$, $2\varphi$, $3\varphi$ . . .

The input ends of several emission antennas 143 are connected to the output ends of several phase shifters 142 correspondingly. For example, as shown in FIG. 3, the number of phase shifters 142 is j, the number of emission antennas 143 is j, and the j emission antennas 143 are connected to the j phase shifters 142 correspondingly. In this embodiment, the several emission antennas 143 are configured to receive the several first optical sub-signals (or the second optical sub-signals) output by the several phase shifters 142, and emit the several first optical sub-signals (or the second optical sub-signals) into space.

Optionally, the several emission antennas 143 may be a grating structure.

In some embodiments, the phased array emission apparatus 100 may further include a connection waveguide. The connection waveguide is provided between various devices as required to implement transmission of the beam and reduce a loss in the transmission process.

In some embodiments, the grating coupler 110, the edge coupler 120, the optical combiner 130, and the phased array unit 140 can be integrated on the same chip, for example, can be processed according to a silicon-based CMOS process, thereby effectively reducing a size of the phased array emission apparatus 100 and improving integration.

In this embodiment of this application, the grating coupler 110 and the edge coupler 120 are provided in the phased array emission apparatus 100, and therefore, when performance needs to be detected, the phased array emission apparatus 100 uses the grating coupler 110 to detect performance, thereby finishing detecting the performance without the need of engraving the wafer; and when in the working state (engraving of the wafer has been completed by then), the phased array emission apparatus 100 uses the edge coupler 120 to implement a relatively low coupling loss, thereby improving coupling efficiency and meeting low-loss requirement in the working state.

Figure 4:
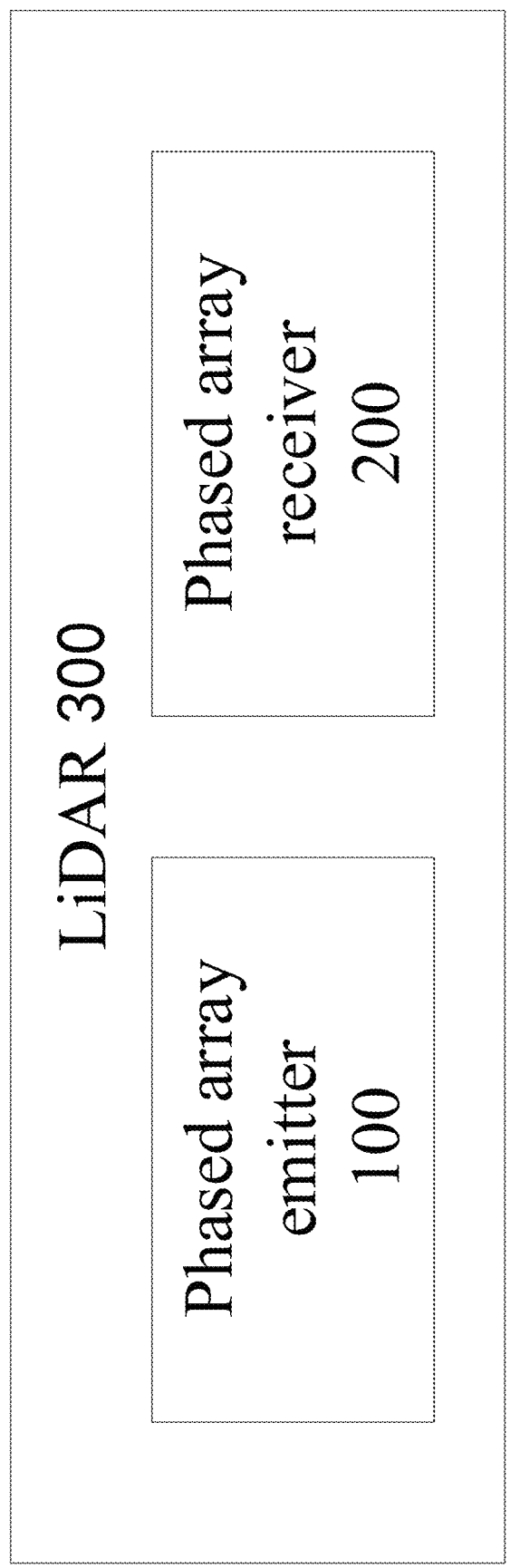
FIG. 4 is a schematic structural diagram of LiDAR according to an embodiment of this application.

FIG. 4 is a schematic structural diagram of a LiDAR according to an embodiment of this application. As shown in FIG. 4, a LiDAR 300 includes a phased array emission apparatus 100 and a phased array receiving apparatus 200.

A structure and a function of the phased array emission apparatus 100 in this embodiment are the same as those of the phased array emission apparatus 100 in the foregoing embodiments. For the specific structure and function of the phased array emission apparatus 100, reference may be made to the foregoing embodiments. Details are not described herein again one by one.

In this embodiment, the phased array emission apparatus 100 is configured to emit an optical signal, and the phased array receiving apparatus 200 is configured to receive an optical signal reflected by the detected object.

In this embodiment of this application, the grating coupler 110 and the edge coupler 120 are provided in the phased array emission apparatus 100, and therefore, when performance needs to be detected, the phased array emission apparatus 100 uses the grating coupler 110 to detect performance, thereby finishing detecting the performance without the need of engraving the wafer; and when in the working state (engraving of the wafer has been completed by then), the phased array emission apparatus 100 uses the edge coupler 120 to implement a relatively low coupling loss, thereby improving coupling efficiency and meeting low-loss requirement in the working state.

Figure 5:
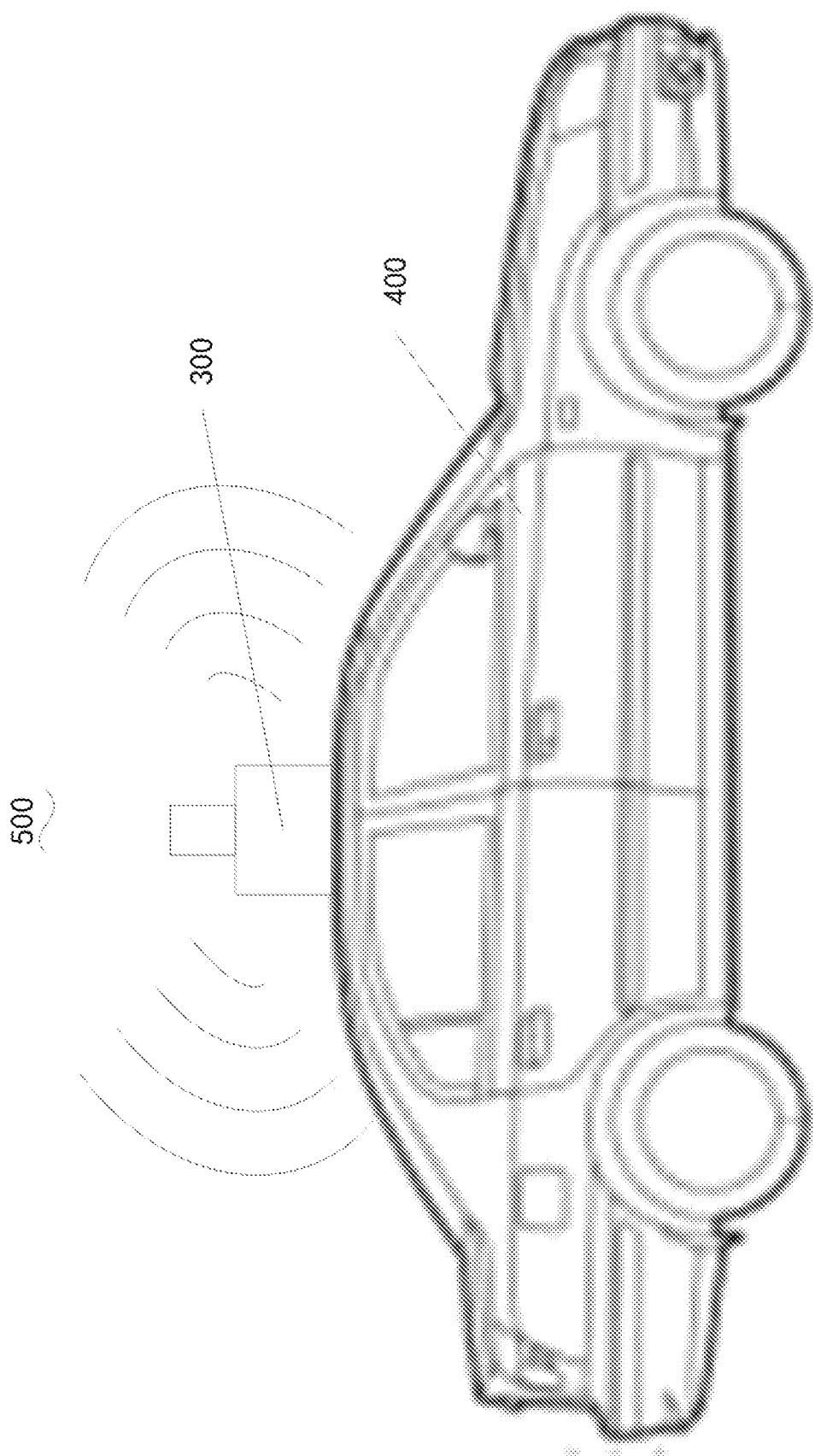
FIG. 5 is a schematic structural diagram of an automated driving device according to an embodiment of this application.

FIG. 5 is a schematic structural diagram of an automated driving device according to an embodiment of this application. As shown in FIG. 5, an automated driving device 500 includes a LiDAR 300 and a vehicle body 400.

A structure and a function of the LiDAR 300 in this embodiment are the same as those of the LiDAR 300 in the foregoing embodiments. For the specific structure and function of the LiDAR 300, reference may be made to the foregoing embodiments. Details are not repeated herein again one by one.

The automated driving device 500 can detect azimuth and a distance of an adjacent object, and make a decision based on the azimuth and distance of the adjacent object, thereby implementing automated driving.

In this embodiment of this application, the grating coupler 110 and the edge coupler 120 are provided in the phased array emission apparatus 100, and therefore, when performance needs to be detected, the phased array emission apparatus 100 uses the grating coupler 110 to detect performance, thereby finishing detecting the performance without the need of engraving the wafer; and when in the working state (engraving of the wafer has been completed by then), the phased array emission apparatus 100 uses the edge coupler 120 to implement a relatively low coupling loss, thereby improving coupling efficiency and meeting low-loss requirement in the working state.

It should be noted that unless otherwise specified, the technical or scientific terms used in the embodiments of this application should have general meanings understood by a person of ordinary skill in the art to which the embodiments of this application belong.

In the description of implementing novel embodiments, orientations or position relationships indicated by the technical terms such as "center," "longitudinal," "lateral," "length," "width," "thickness," "above," "under," "front," "rear," "left," "right," "vertical," "horizontal," "top," "bottom," "inner," "outer," "clockwise," "counterclockwise," "axial," "radial," and "circumferential" are based on the orientations or position relationships shown in the drawings, are merely intended to describe the embodiments of this application and simplify the descriptions, but are not intended to indicate or imply that the indicated device or element shall have a specific orientation or be formed and operated in a specific orientation, and therefore cannot be understood as a limitation to the embodiments of this application.

In addition, the technical terms such as "first" and "second" are merely intended for a purpose of description, and shall not be understood as an indication or implication of relative importance or implicit indication of a quantity of indicated technical features. In the description of the embodiments of this application, "a plurality of" means two or more, unless otherwise specifically defined.

In the description of implementing novel embodiments, unless otherwise clearly specified and limited, technical terms such as "mounting," "connection," "link," and "fixing" should be understood in a general sense. For example, these technical terms may be a fixed connection, a detachable connection, or an integrated connection; or may alternatively be a mechanical connection or an electrical connection; or may be a direct connection, an indirect connection by using an intermediate medium, or an internal link of two elements or an interaction of two elements. A person of ordinary skill in the art may understand specific meanings of the foregoing terms in the embodiments of this application based on a specific situation.

In the description of implementing novel embodiments, unless otherwise clearly specified and defined, that a first feature is "above" or "under" a second feature may mean that the first feature and the second feature are in direct contact, or the first feature and the second feature are in indirect contact through an intermediate medium. Moreover, that a first feature is "above," "over," and "on" a second feature may mean that the first feature is right above or diagonally above the second feature, or may merely indicate that a horizontal height of the first feature is greater than that of the second feature. That a first feature is "below," "under," and "beneath" a second feature may mean that the first feature is right below or diagonally below the second feature, or may merely indicate that a horizontal height of the first feature is less than that of the second feature.

In conclusion, it should be noted that the foregoing embodiments are merely intended for describing the technical solutions of this application, but not for limiting this application. Although this application is described in detail with reference to the foregoing embodiments, persons of ordinary skills in the art should understand that they may still make modifications to the technical solutions described in the foregoing embodiments or make equivalent replacements to some or all technical features thereof, without departing from the scope of the technical solutions of the embodiments of this application. All these modifications or replacements shall fall within the scope of the claims and specification of this application. Particularly, the technical features mentioned in all embodiments may be combined in any manner, provided that no structural conflict occurs. This application is not limited to the specific embodiments disclosed in this specification, but includes all technical solutions that fall within the scope of the claims.

What is claimed is:

1. A phased array emission apparatus, comprising:
   an edge coupler, an optical combiner, and a phased array unit, wherein an output end of the edge coupler is connected to an input end of the optical combiner, and an output end of the optical combiner is connected to an input end of the phased array unit, wherein, in response to the apparatus being in a working state, the edge coupler is configured to transmit a first optical signal, the optical combiner is configured to transmit, to the phased array unit, the first optical signal transmitted by the edge coupler, and the phased array unit is configured to split the first optical signal into a plurality of first optical sub-signals and emit the plurality of first optical sub-signals;

wherein the apparatus further comprises a grating coupler, wherein an output end of the grating coupler is connected to the input end of the optical combiner; and wherein, in response to the apparatus being in a detection state, the grating coupler is configured to transmit a second optical signal, wherein the optical combiner is configured to transmit, to the phased array unit, the second optical signal transmitted by the grating coupler, wherein the phased array unit is configured to split the second optical signal into a plurality of second optical sub-signals and emit the plurality of second optical sub-signals, wherein the optical combiner comprises a first port and a second port, wherein the first port is connected to the output end of the edge coupler, the second port is connected to the output end of the grating coupler, wherein the optical combiner further comprises a third port, wherein the third port is connected to the input end of the phased array unit, and wherein the optical combiner is configured to perform one of the following:

receive, through the first port, the first optical signal transmitted by the edge coupler, and output, through the third port, a part of the first optical signal to the phased array unit based on a preset light splitting ratio of the first port to the second port, or receive, through the second port, the second optical signal transmitted by the grating coupler, and output, through the third port, a part of the second optical signal to the phased array unit based on a preset light splitting ratio of the first port to the second port.

2. The phased array emission apparatus according to claim 1, wherein the optical combiner includes a first transmission cable and a second transmission cable, an end of the first transmission cable is provided with the first port, the other end of the first transmission cable is provided with the third port, an end of the second transmission cable is provided with the second port, the other end of the second transmission cable is provided with a fourth port;

wherein the preset light splitting ratio of the first port to the second port is 99:1; and wherein the preset light splitting ratio refers to a ratio of light output from the first port to that output from the second port when light is input through the third port.

3. The phased array emission apparatus according to claim 1, wherein the optical combiner is a directional coupler.

4. The phased array emission apparatus according to claim 1, wherein the optical combiner is a wavelength multiplexer.

5. The phased array emission apparatus according to claim 1, wherein the phased array emission apparatus further comprises a light source unit, wherein, in response to the phased array emission apparatus being in a detection state, the light source unit is connected to the grating coupler, and the light source unit is configured to output the second optical signal to the grating coupler, and wherein, in response to the phased array emission apparatus being in a working state, the light source unit is connected to the edge coupler, and the light source unit is configured to output the first optical signal to the edge coupler.

6. The phased array emission apparatus according to claim 1, wherein two or more of the edge coupler, the grating coupler, the optical combiner, and the phased array unit are integrated on the same chip.

7. The phased array emission apparatus according to claim 1, wherein the phased array unit comprises:

an optical splitter, provided at the output end of the optical combiner and configured to split the first optical signal into a plurality of first optical sub-signals;

a plurality of phase shifters, provided at the output end of the optical splitter and configured to change phases of the plurality of first optical sub-signals, so that the phases of the plurality of first optical sub-signals meet a preset phase requirement; and a plurality of emission antennas, provided at output ends of the plurality of phase shifters and configured to emit the plurality of first optical sub-signals.

8. A LiDAR, comprising a phased array emission apparatus according to claim 1, and a phased array receiving apparatus, wherein the phased array emission apparatus is configured to emit an optical signal, and the phased array receiving apparatus is configured to receive the optical signal reflected by a detected object.

* * * * *